Aug. 4, 1936.  J. W. RUHSTORFER  2,049,516
PACKLESS VALVE BONNET
Filed Nov. 3, 1933  2 Sheets-Sheet 1
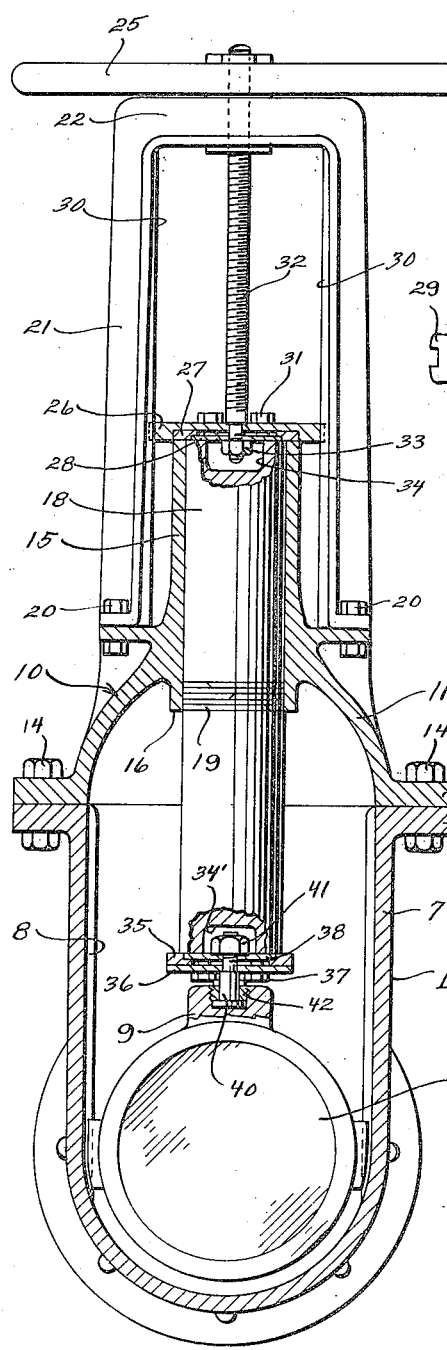
FIG. 1.
FIG. 3.
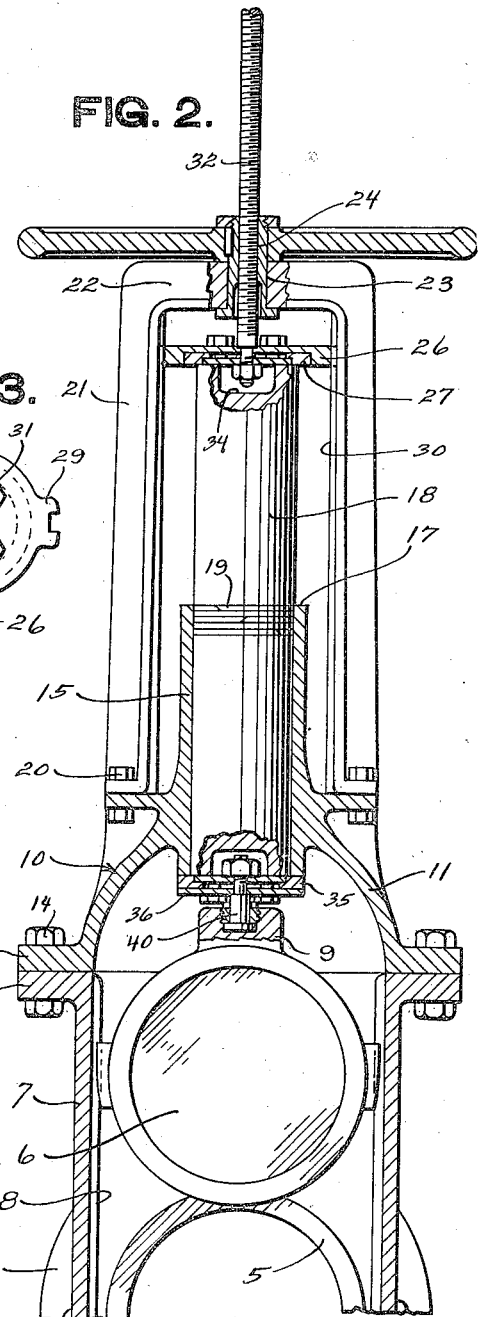
FIG. 2.
INVENTOR.
John W. Ruhstorfer
BY
ATTORNEYS.

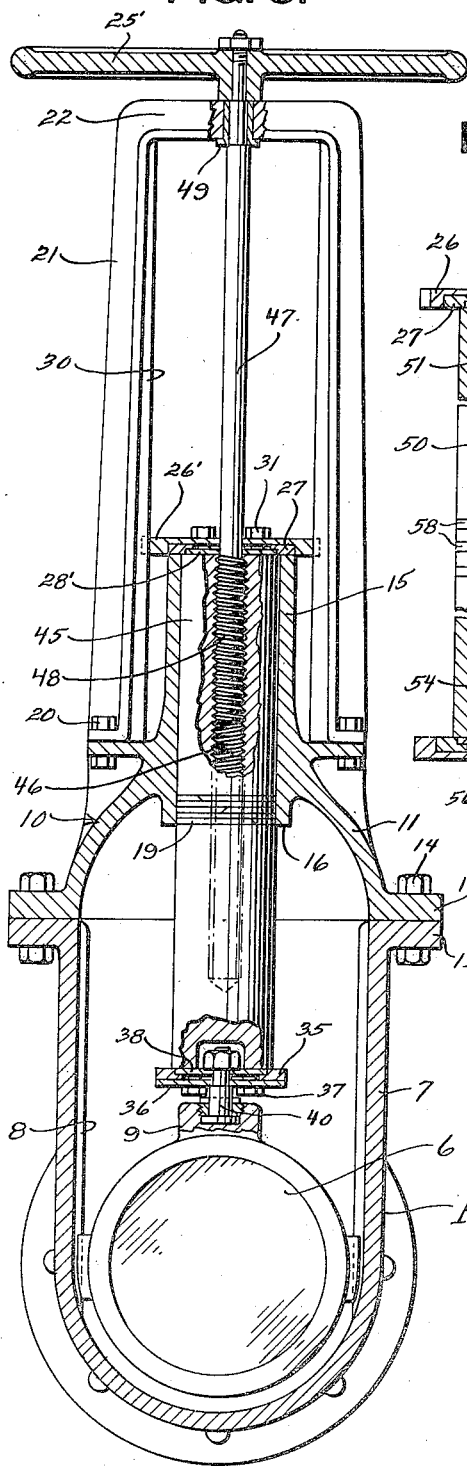
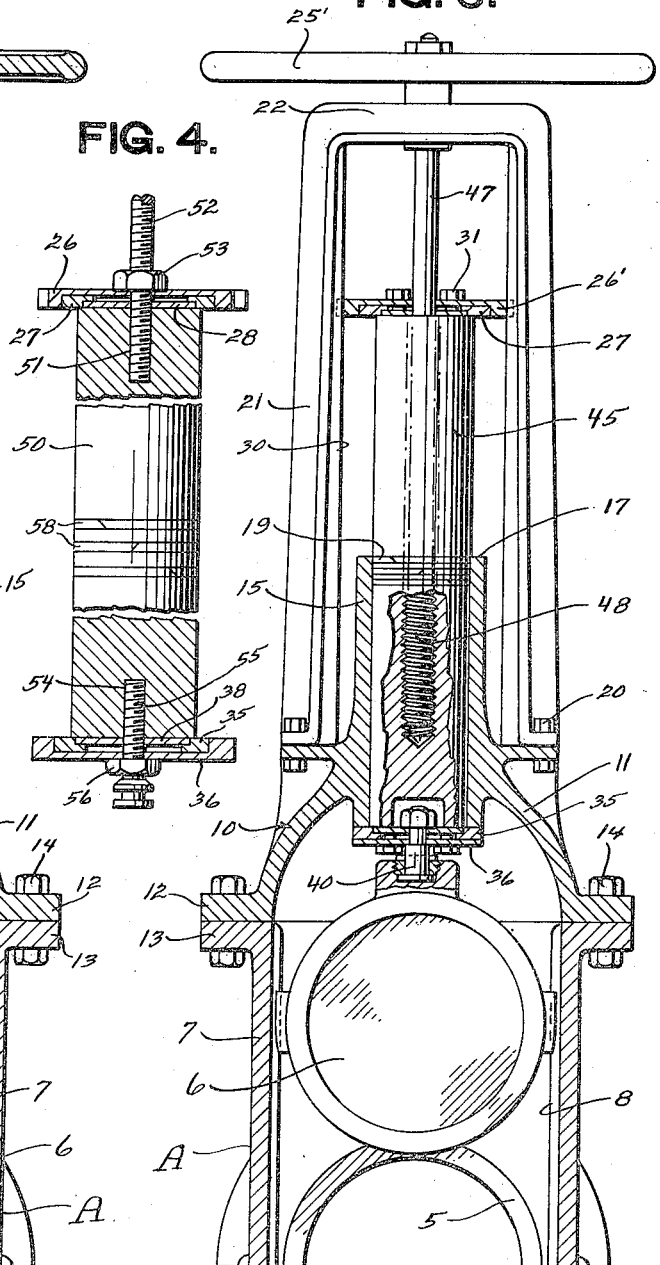

Patented Aug. 4, 1936

2,049,516

UNITED STATES PATENT OFFICE 2,049,516

PACKLESS VALVE BONNET

John W. Ruhstorfer, Detroit, Mich.

Application November 3, 1933, Serial No. 696,583

3 Claims. (Cl. 251—32)

The present invention relates to valves and the primary object of the invention is to provide a packless valve bonnet which will dispense with the usual method of sealing a valve stem by means of a packing box and gland, thereby eliminating leakage and expense in packing and labor costs during life of the valve.

A further object of the invention is to provide a packless valve bonnet wherein a perfect seal will be had at all times when the valve is being operated and also when the valve is in either an open or a closed position.

A further object is to provide a packless valve bonnet for use with either gate or globe valves of either the rising or non-rising stem type.

A still further object resides in the provision of improved operating means for valve elements which may be readily applied to existing types of valve bodies.

A still further object of the invention is to provide operating means for valve elements wherein a piston forms a part of the valve stem and serves to prevent leakage during operation of the valve and provides a sealed joint at the open and closed positions of the stem.

Other objects and advantages of the invention will be apparent during the course of the following detailed description, taken in connection with the accompanying drawings forming a part of this specification and in which drawings:—

Figure 1 is a central longitudinal section thru a valve provided with the improved bonnet and showing the valve closed.

Figure 2 is a section similar to Figure 1 but showing the valve open.

Figure 3 is a fragmentary detail section thru the valve stem above the piston.

Figure 4 is a detail sectional view showing a modified form of piston for use with valves of the rising stem type.

Figure 5 is a sectional view showing the invention applied to a valve of the non-rising stem type and showing the valve closed.

Figure 6 is a view similar to Figure 5 but showing the valve open.

In the drawings and wherein like reference characters designate corresponding parts throughout the several views, in Figures 1 and 2 the invention has been shown applied to a valve of the rising stem type, while in Figures 5 and 6 the invention provides a valve of the non-rising stem type. While the invention has been shown applied to a gate valve it will be readily apparent that the invention may equally well be applied to globe valves or various other forms of valves having an axially movable valve stem.

Referring first to the form of invention shown in Figures 1, 2 and 3, the valve body A is of ordinary construction and provided with the usual seat 5 to be engaged by the gate or valve element 6 upon lowering of the latter upon the seat. The neck 7 of the valve body is provided with the usual internal guides 8 for guiding the gate 6. The gate or valve element 6 is provided with the usual coupling extension or boss 9 to which the operating stem is swivelly connected.

Secured to the open end of the neck 7 is a valve bonnet 10 embodying a dome portion 11 which is flanged as at 12 for connection with the flange 13 of the valve body A as by the coupling bolts 14. Preferably cast integral with the dome portion 11 to extend co-axial with the valve body neck 7 is a tubular guide portion or cylinder 15 of a length slightly greater than the travel of the valve element 6 from its full open to fully closed positions. The lower or inner end of the cylinder 15 projects slightly into the dome portion 11 to provide a ring seat 16, while the outer end of the cylinder is formed with a ring seat 17.

Reciprocally guided with a snug sliding fit in the cylinder 15 is a piston 18 provided midway of its ends with piston rings 19 having a sealing fit with the inner surface of the cylinder. These piston or sealing rings 19 are confined for movement between the ends of the cylinder and provide a perfect seal at all times during operation of the valve.

Secured to the bonnet 10 as by suitable bolts 20 is a yoke 21 provided in its head portion 22 with an opening 23 for rotatably receiving an internally threaded bushing 24 arranged co-axial with the piston 18. Keyed or otherwise fixedly secured to the bushing 24 is a hand wheel 25.

Secured to the outer end of the piston 18 is an outer disc holder and guide 26 which is recessed at its inner side to receive a sealing ring 27 preferably formed of copper or some such soft metal. This sealing ring 27 is adapted to engage upon the outer ring seat 17 when the valve element 6 is in a closed position. A retaining washer 28 serves to retain the ring 27 in position. The holder and guide 26 is provided with diametrically disposed bifurcated ears 29 adapted to have sliding movement upon guides 30 provided along the inner or confronting sides of the arms of the yoke 21 whereby the holder and guide is held against rotation. The holder or guide 26 is rigidly secured to the outer end of the piston

18 by means of suitable cap bolts 31 which also pass thru the washer 28.

Threaded thru the bushing 24 is a valve stem 32 for imparting longitudinal movement to the piston 18 upon rotation of the hand wheel 25. The inner end portion of the stem 32 is reduced in diameter and extended thru suitable openings formed axially of the disc 26 and washer 28, and a retaining nut 33 is threaded upon the inner end of the stem. The outer end of the piston 18 may be recessed as at 34 for accommodating the nut 33.

Arranged at the inner end of the piston 18 is a preferably copper sealing ring 35 held in position by the disc 36 which is secured to the piston by the cap bolts 37. A retainer washer 38 is arranged inwardly of the sealing ring 35 and this washer and the disc 36 are axially apertured to receive a reduced end of a short coupling stem 40 secured in place by the nut 41 accommodated in a recess 34' in the inner end of the piston 18. The coupling pin 40 is connected by means of a retainer nut 42 to the coupling extension or boss 9 of the valve element 6 whereby the valve element is connected for movement by the piston 18. It may here be well to note that the sealing rings 27 and 35 project beyond the circumference of the piston 18 to respectively engage upon the ring seats 17 and 16.

In operation of the rising stem form of valve shown in Figures 1 and 2, when the hand wheel 25 is rotated in a direction for feeding the threaded valve stem 32 inwardly thru the bushing 24, the piston 18 is moved inwardly in the cylinder 15 thus closing the valve element 6 upon its seat 5 and closing the valve. At the time the valve element 6 closes, the sealing ring 27 engages upon the outer ring seat 17 on the cylinder 15 thus forming a perfect seal at the outer end of the cylinder. In this position as shown in Figure 1, the piston rings 19 have not moved beyond the inner end of the cylinder. When the valve is fully opened, the sealing ring 35 at the inner end of the piston 18 engages upon the ring seat 16 within the valve chamber and thus forms a perfect seal at the inner end of the cylinder. Thus leakage past the valve operating means is prevented in either position of the valve by the sealing rings 27 and 35, and by means of the piston rings 19 during operation of the valve from either position.

Referring now to the form of the invention as applied to a non-rising stem valve as shown in Figures 5 and 6, like reference characters have been applied to similar parts as shown in Figures 1 and 2. In Figures 5 and 6, the piston 45 is provided with an axially disposed screw threaded bore 46 which opens at the outer end of the piston and terminates short of the inner end of the piston. The valve stem 47 rotatably extends thru the disc holder and guide 26' and the retainer washer 28' and has a screw threaded inner end portion 48 for threaded engagement in the bore 46. The outer end of the stem 47 is shouldered and journaled in a suitable bushing 49 in the head 22 of the yoke 21. Fixed upon the outer end of the valve stem 47 is the hand wheel 25' for rotating the stem to cause inward and outward feeding of the piston 45. The piston is of course held against rotation by the holder and guide 26' engaging the sides 30. In each form of the invention it will be noted that the sealing rings project inwardly for a short distance over the ends of the piston and this prevents any possible leakage past the point where the valve stems project thru the holders and washers at the outer ends of the pistons. This is particularly true with respect to the outer end of the piston as shown in Figures 5 and 6 where the valve stem 47 rotatably extends thru the members 26' and 28'.

Figure 4 shows a modified form of piston and stem sealing means for use upon a rising stem valve such as shown in Figures 1 and 2. In Figure 4, the piston 50 is provided axially of its outer end with a threaded socket 51 for threaded reception of the inner end of a threaded valve stem 52. In this form of the invention, the combined holder and guide 26, sealing ring 27 and retainer washer 28 are held in position at the outer end of the piston by means of the lock nut 53 threaded on the valve stem 52. The piston 50 is provided axially of its inner end with a threaded socket 54 into which is threaded a coupling stem 55 having its outer end adapted for suitable connection to a valve element. A lock nut 56 threaded on the coupling stem 55 serves to secure the sealing ring 35, holder 36 and retainer washer 38 in position at the inner end of the piston. The piston 50 is provided midway of its ends with a suitable number of piston rings 58.

Thus it will be seen that in each form of the invention, the piston forms a portion of the valve stem and provides a coupling element between the valve operating wheel and the valve element serving to prevent leakage from the valve chamber during operation of the valve. When the valve element 6 is in either of its positions of limited movement, the sealing rings 27 or 35 will form a perfect seal upon their respective seats 17 and 16. Thus an improved operating means for valve elements has been provided which will dispense with the usual packing glands, etc., and will provide for a perfect seal at all times when the valve is being operated and also when the valve element is in either an open or closed position.

Changes in detail may be made to the forms of the invention as herein shown and described, without departing from the spirit of the invention or the scope of the following claims.

I claim:

1. In a valve, a bonnet including a cylinder having a ring seat provided at each end thereof, a piston reciprocably movable in the cylinder, a sealing ring secured to each end face of the piston for engaging upon said seats, valve element coupling means carried by the inner end of the piston, a yoke carried by the bonnet and provided with guides, a holder for the sealing ring at the outer end of the piston and having ears slidable on said guides to prevent rotation of the piston, a threaded valve stem rigidly secured at one end to the outer end of the piston, a bushing journaled against axial movement in the yoke and thru which the valve stem is threaded, and means for imparting rotation to the bushing.

2. In a valve, a bonnet including a cylinder having a ring seat provided at each end thereof, a piston reciprocably movable in the cylinder and having an axial screw threaded bore opening at the outer end of the piston, a sealing ring at each end of the piston for engaging upon said seats, means for securing a valve element to the inner end of the piston, means for preventing rotation of the piston, and a rotatable valve stem having a threaded portion engaging in said threaded bore for imparting longitudinal movement to the piston for opening and closing the valve element.

3. In a valve, a bonnet including a cylinder having a ring seat provided at each end thereof, a piston reciprocably movable in the cylinder and having a threaded socket axially of each end thereof, a sealing ring at each end of the piston for engaging upon said seats, a disc holder for each of the sealing rings, a valve element coupling stem threaded into the socket at the inner end of the piston, a retaining nut on the coupling stem for securing the disc holder at the inner end of the piston, a valve stem threaded into the socket at the outer end of the piston, and a retaining nut on the valve stem for the disc holder at the outer end of the piston.

JOHN W. RUHSTORFER.